United States Patent

[11] 3,568,723

| [72] | Inventor | Donald Maurice Sowards<br>Ashbourne Hills, Claymont, Del. |
|---|---|---|
| [21] | Appl. No. | 648,332 |
| [22] | Filed | June 23, 1967 |
| [45] | Patented | Mar. 9, 1971 |
| [73] | Assignee | E. I. duPont de Nemours and Company<br>Wilmington, Del. |

[54] METAL-CERAMIC COMPOSITE STRUCTURES
5 Claims, 2 Drawing Figs.

[52] U.S. Cl.................................................... 138/143,
138/177, 164/98, 138/111
[51] Int. Cl..................................................... F16l 9/14
[50] Field of Search............................................ 138/140,
141, 142, 143, 144, 145, 146, 177, 89, 111,
(Inquired); 55/16, 74; 181/40, 62, (Inquired);
164/98, (Inquired); 60/29, (Inquired);
264/(Inquired); 106/(Inquired)

[56] References Cited
UNITED STATES PATENTS

| 2,824,620 | 2/1958 | De Rosset................ | 55/16 |
| 3,044,499 | 7/1962 | Frerich.................... | 138/143 |
| 3,129,727 | 4/1964 | Tanaka.................... | 138/143 |
| 3,141,479 | 7/1964 | Mickey.................... | 138/143 |
| 3,252,270 | 5/1966 | Pall et al.................. | 55/74 |

*Primary Examiner*—Houston S. Bell, Jr.
*Attorney*—Lynn N. Fisher

ABSTRACT: Metal-ceramic structures are made by casting molten metal around ceramic cores having specific physical properties. Most important of these properties is that the surface of the core which forms part of the metal-ceramic interface must have a porosity of between 20 and 80 percent and the porosity created by a multiplicity of uniformly distributed pores ranges from 25 to 2500 microns in size.

INVENTOR
DONALD M. SOWARDS

BY  *Lynn N. Fisher*

ATTORNEY

METAL-CERAMIC COMPOSITE STRUCTURES

BACKGROUND OF THE INVENTION

There is a need for durable metal-ceramic composite structures in which the thermal chemical resisting and abrasion resisting properties of a ceramic material can be combined with the fabricability and structural reliability of metals. Such structures would be useful in the handling of hot and erosive fluids or would provide thermal insulating structures, for example, ceramic lined exhaust manifolds and mufflers for gasoline and diesel engines.

However, such structures have been difficult to obtain in that a sufficient bond needs to be formed between the ceramic and the metal; the ceramic must be strong enough to withstand failure due to thermal shock, the weight of molten metal and the compressive forces developed during cooling of the metal; while on the other hand, the ceramic must not be so strong that it will fracture or weaken the hot cast metal during cooling.

The obtainment of such structures with a proper balance of physical properties has been a long standing problem in the ceramic and metal-casting art.

BRIEF SUMMARY OF THE INVENTION

I have found that such composite structures can be obtained by providing a ceramic core having certain properties.

The ceramic core must have a surface with a porosity of 20 to 80 percent, the porosity created by a multiplicity of uniformly distributed pores of 25 to 2500 microns in size. This surface porosity facilitates the formation of mechanical bonds between the ceramic core and the cast metal as the metal is cast upon it and cools. Further, this surface porosity should extend to a depth of at least 100 to 2500 microns into the ceramic core. The minimum depth depends upon pore size, thus with pores of 25 microns the depth would be at least 100 microns and with the larger pores, e.g., 2500 microns, the minimum depth would be 2500 microns. This provides for the physical yielding or crushing of the core surface during the cooling of the cast metal, thus accommodating the metal shrinkage without tearing or fracture of the metal.

Additionally, the ceramic core must have an overall crushing or compressive strength between 200 and 6000 p.s.i. such that it is strong enough to resist massive failure due to thermal shock or the compressive forces developed as the cooling causes contraction of the cast metal.

With the use of such cores, the production of metal-ceramic composites becomes practicable and further, composites of complex shapes can be easily and economically made.

Figure 1:
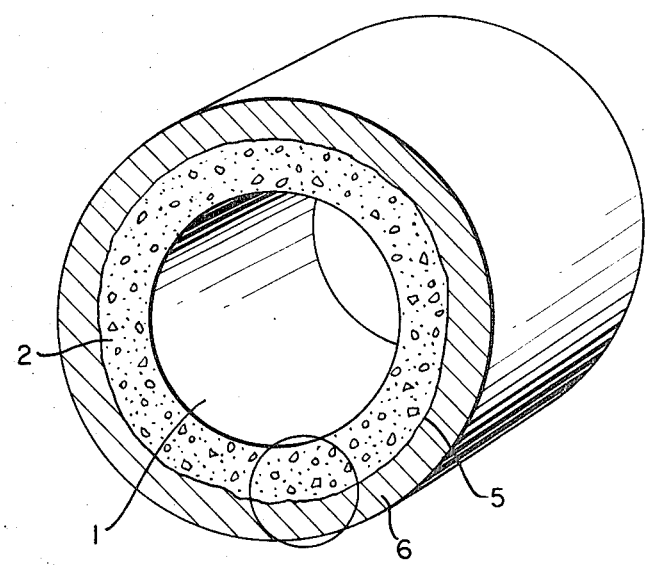
FIG. 1 illustrates an embodiment of the metal-ceramic composite structure of the invention.
Figure 2:
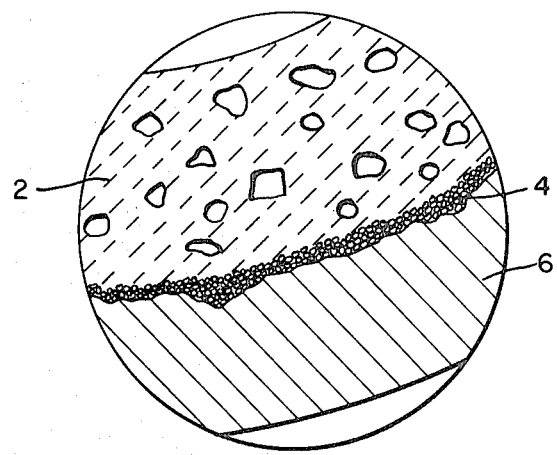
FIG. 2 is an artist's diagrammatic representation of an enlarged view of the circled portion of FIG. 1. In order to illustrate the interfacial porosity, this representation is not necessarily drawn to scale.

The structure shown in the FIGS. is a conduit for exhaust gases. Exhaust gases pass through the hollow interior 1 of a ceramic core 2. The core has an outer surface 4 of specified porosity. This surface 4 forms an interface 5 with the cast metal 6. The cast metal defines the desired exterior shape of the structure.

DETAILED DESCRIPTION

The metal-ceramic composite structure of the invention is composed of a ceramic core having a hollow interior for the passage of various fluids and gases which would be corrosive or erosive to conventional metals of construction. Surrounding this hollow core is a cast metal jacket.

The size and shape of the ceramic core is not critical. These parameters will generally depend upon the nature of the end use of the composite. As will be explained subsequently, in view of the dimensional stability obtained in making the ceramic cores of the invention, complex shapes are easily made.

The ceramic core can be made of several refractory materials. Thus it can be made of alumina, magnesium aluminate spinel ($MgO \cdot Al_2O_3$), mullite ($3Al_2O_3 \cdot 2SiO_2$), zirconia, zirconia stabilized with calcium oxide or magnesia, silica, chromia, metal silicates, other spinels, the carbides of boron, silicon, titanium, and tungsten; the nitrides of alumina, boron, titanium, uranium, and zirconium, and the borides of chromium, molybdenum, titanium, tungsten and zirconium. Precursers and mixtures and compounds containing the above refractory compounds can also be used.

The refractory to be used will generally be selected in view of the process used to make the ceramic core. The choice of refractory material is not critical in that the only important parameters are the physical properties of the finished ceramic core structure. Thus any of the above refractories can be used if they can be suitably processed to result in this ceramic core. As will be subsequently pointed out, alumina or mullite are particularly preferred refractory materials in view of the suitable processes which can be used with these materials to make the core.

The ceramic core must have an overall crushing or compressive strength which ranges between 200 and 6000 p.s.i. and preferably between 1000 and 3000 p.s.i. This property is necessary to provide the core with sufficient strength to withstand the compressive stresses resulting from the casting and cooling of the hot metal.

The most important property of the ceramic core is its surface porosity. By surface porosity it is meant the surface of the ceramic core that will become part of the ceramic-metal interface. Further, this porosity must extend into the ceramic core for a depth of at least 100 to 2500 microns depending upon pore size. With pores about 25 microns in size the depth should be at least 100 microns, while at the other extreme of pore size, 2500 microns, the depth should be at least 2500 microns.

The ceramic core must have a surface porosity between 20 and 80 percent; a porosity of 30 to 50 percent is preferred. Further, this surface porosity is characterized in that it is a uniformly distributed multiplicity of pores ranging in size from 25 to 2500 microns.

When the hot metal is cast upon this ceramic surface, the metal upon cooling will go into these pores and locally crush and/or penetrate the surface. The low heat capacity of the surface insulating layer reduces the initial chilling of molten metal to permit it to interact longer before solidification, thus the metal penetrates and collapses the porous layer locally. This activity results in two important features.

1. There will be a large number of mechanical bonds created between the metal layer and the ceramic core. The bond produced is not as strong as a metallurgical bond; however, for use in exhaust systems and the like, the bond is desirable since it is very durable under changes in thermal conditions. Thus, these bonds will hold up when the composite structure is subjected to elevated temperatures and the ceramic and metal expand at different rates.

This feature also results in the advantage that the ceramic core, once the metal has been cast and solidified, will be under compression. Ceramic materials exhibit their best properties under compression.

2. The surface porosity reduces the surface strength of the ceramic core. Thus, the porous surface layer will give to accommodate the shrinkage of the metal upon cooling. Further, porosity provides volume into which the metal can be forced by shrinkage forces. These features thus avoid the cracking of the metal by relieving its tensile stresses.

The remaining portion of the ceramic core, i.e., the portion from a surface layer of at least 100 microns in thickness to the central void, does not have a critical porosity. The porosity of this portion of the core can vary from 0 up to 80 percent. The porosity selected will be such as to create a balance between the surface porosity and porosity needed to provide the overall properties desired for the composite. Thus, the porosity of this portion should be such that the desired crushing or compressive strength is obtained. Further, it should be such that the thermal stability, thermal insulation, and wear resistant properties of the core are that required for the ultimate use of the composite.

Thus, the porosity of this portion will depend upon the nature of the environment in which the composite is used. When the composite is to be used for thermal insulation purposes, the porosity of this portion would generally be higher. However, if the structure is too porous, this will decrease the wear resistant properties of the core.

If it is desired to have sound-absorbing properties in the metal-ceramic composite, it would be advantageous to have the entire core having a high porosity, i.e., on the order of 70 to 80 percent.

There are several methods that can be used to make the ceramic core such that it has the desired physical characteristics.

One method would be to mix the refractory material in the form of fine particles, i.e., between 2 and 25 microns in size, with a material which upon firing will be decomposed. The decomposable material should have a particle size between 25 and 2500 microns.

This mixture is then molded to the desired shape, and fired or sintered to burn out the decomposable material and form the porous structure.

It is only necessary to include the decomposable material in the surface layer; the rest of the green body need only contain the desired refractory material.

Example 2 is an illustration of a process of this nature. In that example, as an aid in molding the green mix, sodium silicofluoride and sodium silicate are added to the refractory material to cause it to set.

The more preferred methods of making the ceramic core involves processes wherein the core could be produced in a dimensionally stable manner, i.e., the process would not have to be designed to accommodate the shrinkage of the refractory material during the firing conditions.

One such method of making the three-dimensional core structure would be the in situ oxidation of aluminum to alumina. If this process is followed, there is no dimensional change in the green body as compared to the fired body, thus an economical method is obtained.

The in situ oxidation process can be accomplished by mixing from 6 to 50 percent by weight of particles of aluminum or aluminum alloys having a particle size that it will pass through an 80 mesh screen with 50 to 94 percent by weight of alumina granules having a size between 4 and 100 mesh and 0.02 percent to 10 percent based on the weight of the aluminum and alumina granules of a fluxing agent.

All sieve measurements are made with U.S. Sieve Series.

This mixture is then shaped to give the desired porosity and fired in an oxidized atmosphere at a temperature between 650° and 1700° C. for a period of time to oxidize at least 40 percent of the aluminum. The core thus produced will consist essentially of alumina in a porous in situ oxidized structure.

The granular alumina used in this process can be in the form of porous or nonporous particles or grains. Thus alumina bubbles can be used as well as solid alpha alumina crystals. Tabular alumina and calcined alumina are also useful in this process.

Instead of alumina, other refractory materials can be used as long as they have a particle size of 20 mesh or smaller. Thus, the useful refractories include the carbides of boron, silicon, titanium, and tungsten; the nitrides of aluminum, boron, titanium, uranium, and zirconium; and the borides of chromium, molybdenum, titanium, tungsten, and zirconium.

Aluminum particles or particles of alloys of aluminum with other metals in which the aluminum constitutes the major component may be used in this process.

Suitable fluxing agents are an oxide of a metal from the class consisting of the alkali metals, the alkaline earth metals, vanadium, chromium, molybdenum, tungsten, copper, silver, zinc, antimony and bismuth, precursers of these oxides, and hydroxides of the alkali metals. The oxides and hydroxides of the alkali metals, magnesium, strontium, and barium are preferred due to their greater efficiency. The alkali metal compounds are most preferred.

Among the suitable precursers of the materials may be mentioned the organic salts such as the acetates, benzoates, and inorganic salts such as bisulfates, bisulfites, bromates, nitrates, silicates, sulfates, sulfites, etc. of the recited metals.

The fluxing agent is calculated on the basis of the metal oxide that it forms in those cases where a metal oxide precurser is used. The metal oxide or a hydroxide can vary in amount from 0.2 percent to 10 percent or more based on the total weight of the aluminum. Preferably from about 0.2 to 3 percent is used. The fluxing agent is intimately mixed with the metal particles.

In some cases it is advantageous to add minor amounts of water, ethyl alcohol, ethylene glycol, acetone solutions of carboxy methylcellulose, rubber, polyvinyl alcohol, natural gums and the like to increase the green strength of the shaped object.

The desired porosity can also be developed by including decomposable materials in the green mix. These materials include polystyrene pellets, sawdust, coconut charcoal and the like. Upon being fired these materials are decomposed and in their place pores are created. These materials should be of such size that the desired pore size is developed.

The unfired mixture of metal, fluxing agent and alumina is then compacted so that the desired surface porosity is obtained. Further, at this time the central passageway or conduit is created.

The dried molded object is then heated in an oxidizing atmosphere such as air, oxygen, or mixtures of oxygen and inert gases at a temperature of at least around 600° C. The exact conditions for firing will depend upon the green porosity of the shaped object, the amount of metal, the amount and kind of fluxing agent, and the temperature. These conditions will be readily apparent to one skilled in the art. The heating is continued until the oxidation of the aluminum is 90 percent or more complete.

In a modification of this process, prior to the firing step, an agent can be added to the green mix to aid in the setting of the shaped and unfired mixture. Thus an agent such as sodium fluorosilicate in the amounts of 0.1 to 1 percent by weight of the total solids with sodium silicate can be added. The sodium fluorosilicate bonds the refractory bodies together and there is no dimensional change during this bonding step. Subsequently, when the body is fired, there is no dimensional change in the structure.

The ceramic cores can be made in other ways. Sufficiently strong structures can be obtained by bonding the refractory particles with inorganic oxide gels formed under controlled conditions. Thus, a silica gel which is produced from the controlled neutralization of sodium silicate during dissolution and hydrolysis of sodium fluorosilicate provides a strong bond between particulate solids such as alumina, aluminum, zirconia, zircon, silicon carbide and the like.

In this process, provided the drying is controlled to accommodate gel shrinkage during the curing of the bonded structure, a suitable refractory core can be set up having the desired porosity. Other than sodium fluorosilicate, other neutralizing agents such as organic esters, ethyl acetate or urea can be used for joining the silicates or colloidal inorganic salts.

The ceramic core can also be made by thermal setting. Thus the particles would be mixed with materials such as guanadine silicate solution which upon the application of heat would bond the particles together to form the desired structure and subsequently upon heating the gelled guanadine silicate would be decomposed to end up with a thermally bonded refractory product. The guanadine silicate can also be gelled by contact with $CO_2$. The guanadine silicate solutions useful in this process are described in assignee's pending application Ser. No. 648,216 filed Jun. 23, 1967 now abandoned.

It has been found advantageous to fill the hollow void of the core with a temporary supporting structure, e.g., resin bonded sand, during the casting process. Thus if for any reason there is cracking of the ceramic core during the cooling or the casting of the hot metal, this resin bonded sand will keep the core from shifting or breaking away from the hot metal and a good mechanical bond will be formed.

A suitable metal is then cast around the core. The metal used is not critical and will only depend upon the desired end use. Suitable metals include white cast iron, gray iron, aluminum, copper, lead, magnesium, silver, steel, tin, zinc, brass, bronze, alloys of these metals, e.g., steel alloys, and refractory metals.

The invention will now be illustrated in the following examples, wherein the parts are parts by weight unless otherwise indicated.

EXAMPLE 1

To a mixture consisting of 40 parts of aluminum particles of 80 mesh or smaller particle size is added about 60 parts alumina bubbles (hollow particles) of 8 mesh size. To this dry mixture of aluminum and alumina particles is added 25 parts of 40° Bé sodium silicate solution (3.25:1 ratio of $SiO_2:Na_2O$) to form a plastic mass.

Also to this mixture is added 5 parts of 1 percent aqueous carboxymethyl cellulose solution as a thickener to enhance the plasticity.

At this time, one part of sodium fluorosilicate is added to the mixture to gel the sodium silicate. The sodium fluorosilicate slowly acts to set up the unfired mixture.

The plastic mass is then formed into desired shape which is a hollow cylinder of $\frac{1}{2}$ inch ID X 4 inch long and a wall thickness of one-half inch, allowed to set, and then dried. The resulting unfired shape exhibits about 50 percent porosity.

The shape is then fired in an oxygen containing atmosphere to oxidize the aluminum and form a strong bonding network consisting of alumina and compounds and solid solutions of alumina containing at least 72 percent aluminum oxide.

The fired shape is then used as a core in a metal casting process. The hollow interior of the core is filled with resin-bonded sand for support and positioning and the core is placed in a mold by using graphite rods which have been placed partly in the interior of the core. The assembled mold is then heated to 1600° C. in an electric furnace.

Molten gray iron at 2650° F. to 2750° F. is cast into the mold to fill the annulus between the ceramic core and the mold.

The gray iron has a composition of:

| | |
|---|---|
| Fe | 93.35 percent |
| C | 3.53 percent |
| Si | 2.28 percent |
| Mn | 0.63 percent |
| S | 0.11 percent |
| P | 0.10 percent |

In cooling and the resulting shrinkage of the gray iron an excellent mechanical bond is formed between the core and the gray iron jacket. The resulting structure is a metal-ceramic which does not have any cracks or flaws and is useful as a conduit for hot exhaust gases and the like.

EXAMPLE 2

To a mixture of 100 parts −100 mesh silicon carbide and 1 part sodium silicofluoride is added 30 parts 40° Bé sodium silicate. The thixotropic, puttylike mixture is rolled out as a ¼-inch thick sheet.

The surface is sprinkled with fine granules of polystyrene, which are then rolled into the surface of the sheet. The sheet is then formed around a 2 inch diameter rod, with the polystyrene side out, and allowed to set to a rigid structure. This takes about 1 hour from the time of blending. After air drying for 20 hours, the solid cylinder is removed from the rod and heated to 500° C. for 30 minutes. A strong porous surface cylinder results.

The cooled cylinder is packed with air-setting foundry sand to a distance of one-half inch beyond the ends. After the sand hardens, the exposed ends are trimmed to fit the core prints of a cylindrical sand mold.

The mold and ceramic core are assembled and cast with molten ductile iron alloy. After cooling and removing the sand, a silicon carbide lined metal pipe results.

EXAMPLE 3

80 parts of commercially available tabular alumina (99.5+percent $Al_2O_3$, 0.02 percent $Na_2O$) of 14/28 mesh is mixed with 20 parts of aluminum powder (99.5 percent Al, 100 percent passes 200 mesh and 85 percent passes 325 mesh) and about 1 part by weight of a 2 percent aqueous solution of sodium carboxy methyl cellulose per 3 parts of alumina-metal mix.

The damp mixture is then compacted in a mold coated with an identical composition admixed with wood flour and a small amount of starch as a coating binder.

The molded body is fired in an air atmosphere under the following schedule:
25° to 650° C. in 8 hours
650° C. for 12 hours
750° C. for 12 hours
750° to 1000° C. in about 4 hours
1000° C. for 8 hours
1000° to 1500° C. in 7 hours and
1500° C. for 24 hours.

Inspection after firing shows that the wood flour has burned out to leave a 700 micron thick surface with a substantial density of pores of from 30 to 120 microns in diameter.

This cylinder is fitted with graphite plugs at each end for positioning and supporting in a mold. After casting with gray iron and cooling, a useful metal-ceramic composite structure resulted.

EXAMPLE 4

A section of 2 inch diameter dense alumina tubing is cut into 8 inch lengths and treated as follows:

Sample 1. This sample is filled with sand according to the procedure of Example 2 and cast with molten ductile iron alloy. After removing the sand it is observed that the metal is torn in several places and the ceramic cracked. The two materials show no signs of bonding and could be easily separated.

Sample 2. This sample is treated by the same procedure of Sample 1, except the mold is slowly heated to 2480° F. before casting the metal. After slow cooling and removal of the sand, the metal is observed to be torn in several places. The ceramic is easily dislodged by hitting the outer metal portion with a hammer.

The first two samples illustrate the properties of a metal-ceramic composite wherein the ceramic core does not have the specified surface porosity.

3. 3. This sample is coated with a 1/16-inch layer of − 40 +100 mesh alumina powder using sodium silicate and carboxymethylcellulose as a binder. The sample is placed in a mold and cast as set forth for Sample 1.

After cooling and removal of the sand, the metal component is found to be of good quality, but several small pieces of the ceramic fell away from the metal. The composite is exposed to alternating hot and cold sand blasting. It shows excellent abrasion resistance, but the ceramic liner is gradually lost by cracking and spalling, evidently because of the poor bonding afforded by the powdered alumina interface.

Sample 4. This sample is prepared according to the procedure of Sample 2. except that at ⅛-inch thick quartz wool pad is wrapped around the ceramic tube. A casting with sound metal and ceramic components was obtained. After sectioning of this composite, it was found that there is very little bonding of the ceramic to the metal.

EXAMPLE 5

A 3 inch diameter fused silica tube is cut into 10 inch lengths and processed as follows:

Sample 1. The sample is filled with foundry sand and positioned in a mold. The assembly is heated to 1500° F. and cast with gray iron. After cooling and removal of the sand, the metal is observed to be torn in several places, while the ceramic tube is intact. There is some bonding between the metal and ceramic, but the ceramic separates from the metal during thermal cycling of the composite between room temperature and 1500° F.

Sample 2. A section of the silica tube is coated with a mixture of − 40 + 100 mesh silica frit and chopped acrylic fiber staple. About 2 percent lime is added to the coating as a mineralizer. The coated tube is heated for 4 hours at 250° C. to char the fibers without melting; this is followed by sintering at 1300° C. An adherent porous coating on the tube results.

The treated tube is cast as in Sample 1 to yield a composite with sound metal and ceramic as well as excellent bonding between the two components. The sample is unchanged after thermal cycling and when broken with a hammer, fracture did not occur at the interface bond area.

EXAMPLE 6

A mixture of 100 parts aluminum powder, 200 parts alumina powder, and 50 parts ethyl acetate is blended with 40° Be sodium silicate to give a puttylike consistency. This mixture is rolled out on several layers of cheese cloth to produce a sheet about one-fourth inch thick. The sheet is clamped around a 1½inch diameter plastic foam core, cloth side outward, by use of two shells obtained by splitting a 2⅛ inch (inside diameter) pipe parallel to its axis.

The assembly is heated to about 60° C. for about 1 hour and cooled. On removing the outer shells, it is found that the molding composition has solidified. The composition is fired according to the schedule of Example 1. The ceramic cylinder so produced has a latticelike porous outer surface remaining from the burned cheesecloth layers.

This ceramic cylinder is cast with molten aluminum alloy. After cooling and removal of the sand, a sound composite structure is obtained.

I claim:

1. A hollow ceramic core upon which molten metal can be cast and cooled, said core having a compressive strength between 200 and 6000 p.s.i. and a surface upon which the metal is cast that is crushable to accommodate shrinkage and facilitate mechanical bonding of the cast metal upon cooling, said surface characterized in having up to a depth of at least between 100 and 2500 microns a porosity between 20 and 80 percent, said surface porosity further characterized in that it consists of a multiplicity of uniformly distributed pores ranging in size from 25 to 2500 microns.

2. A core as set forth in claim 1 made of refractory selected from the group consisting of alumina, mullite, and mixtures of alumina and mullite.

3. A core as set forth in claim 1 wherein the body of the core has a total average porosity between 0 and 50 percent.

4. A hollow metal-ceramic composite structure comprising a hollow ceramic core having a compressive strength between 200 and 6000 p.s.i., the surface of said ceramic core at the ceramic-metal interface, up to a depth of at least between 100 and 2500 microns, having a porosity of 20 to 80 percent, said porosity characterized in that it consists of a multiplicity of uniformly distributed pores ranging in size from 25 to 2500 microns, a metal layer covering said metal-ceramic interface and mechanically bonded thereto.

5. The composite structure of claim 4 in the form of an exhaust manifold where the exhaust gases pass through the hollow refractory core.